United States Patent [19]

Faison

[11] Patent Number: 4,498,869

[45] Date of Patent: Feb. 12, 1985

[54] SYSTEM FOR TEACHING VISUAL DISCRIMINATION OF SPATIALLY ORIENTED SUBJECT MATTER

[76] Inventor: Marilyn D. Faison, 1404 Giltspur Rd., Richmond, Va. 23233

[21] Appl. No.: 588,198

[22] Filed: Mar. 12, 1984

[51] Int. Cl.³ .................... G09B 17/00; G09B 1/32
[52] U.S. Cl. .................................. 434/184; 434/347
[58] Field of Search ............. 434/184, 258, 259, 236, 434/322, 347; 273/273, 236, 293

[56] References Cited

U.S. PATENT DOCUMENTS

| | | | |
|---|---|---|---|
| 1,571,488 | 2/1926 | Moisan et al. | 273/236 |
| 2,019,732 | 11/1935 | Roland | 273/293 |
| 2,723,465 | 11/1955 | Silverstein | 434/184 X |
| 2,959,871 | 11/1960 | Honkavaara | 434/236 |
| 3,042,408 | 7/1962 | Johnson | 273/273 X |
| 3,413,004 | 11/1968 | Smith | 273/273 X |
| 3,841,628 | 10/1974 | Goldfarb | 273/273 X |
| 3,892,409 | 7/1975 | Herbert, Jr. | 273/273 X |
| 4,045,884 | 9/1977 | Zand | 434/184 |
| 4,163,560 | 8/1979 | Solomon | 273/273 |

FOREIGN PATENT DOCUMENTS 270881 5/1927 United Kingdom ............... 434/236

*Primary Examiner*—William H. Grieb
*Attorney, Agent, or Firm*—Norman B. Rainer

[57] ABSTRACT

An instructional system is provided for training persons to more accurately interpret visually perceived stimuli. The system utilizes a kit comprised of figure pages and a set of checking cards for each figure page. The figure pages contain groups of figures in different orientations, including mirror-image relationships. Each checking card has a figure corresponding to a figure of the associated figure page. Repetitious matching of the checking cards with the figures of a given figure page fosters development of improved perception of mirror-image relationships.

9 Claims, 6 Drawing Figures

| A-4 | A-3 | A-2 | A-1 |
|---|---|---|---|
| A-8 | A-7 | A-6 | A-5 |
| A-12 | A-11 | A-10 | A-9 |
| A-16 | A-15 | A-14 | A-13 |

SYSTEM FOR TEACHING VISUAL DISCRIMINATION OF SPATIALLY ORIENTED SUBJECT MATTER

BACKGROUND OF THE INVENTION

This invention concerns a system for teaching persons to improve their visual perception, and more particularly relates to a kit and its manner of use for training handicapped persons to properly interpret the spatial orientation of visually perceived stimuli.

Certain disorders are encountered particularly in young people of elementary school age, wherein the mental image of visually perceived things is reversed from the true state. Such disorders, one of which being known as dyslexia, cause extreme difficulties in the process of learning to read printed material.

It is accordingly an object of the present invention to provide an instructional system in kit form for training handicapped persons to more accurately interpret visually perceived stimuli.

It is another object of this invention to provide an instructional system as in the foregoing object capable of self-administration by the handicapped person or administration by a teacher of said person.

It is a further object of the present invention to provide an instructional system of the aforesaid nature which provides a variety of interpretive visual topics and a progressively increasing level of difficulty of interpretation.

It is a still further object of this invention to provide an instructional kit of the aforesaid characteristics of simple construction which may be economically fabricated.

These objects and other objects and advantages of the invention will be apparent from the following description.

SUMMARY OF THE INVENTION

The above and other beneficial objects and advantages are accomplished in accordance with the present invention by an improved teaching system utilizing a kit which comprises:

(a) a set of figure pages containing printed indicia, the front face of each page having ruled lines dividing the page into an array of rectangular spaces disposed in horizontal rows and vertical columns, said spaces containing randomly distributed closed line figures in at least two groups wherein the figures of a given group are identical but appear in different orientations, the front face of each page bearing identifying indicia in each space, and (b) a set of checking cards, the front faces of which contain indicia corresponding to the figures on the front face of a page of said set of figure pages, and the rear face of each card containing identifying indicia corresponding to the identifying indicia on the front face of said figure page associated with the same figure, the number of cards in each set being equal to or greater than the number of spaces on the front face of the corresponding figure page.

In a preferred embodiment of the invention, the checking cards are in the form of card sheets from each of which the individual cards of the set are produced by cutting or by tearing along perforated lines, the size of the card sheet being the same as the size of the corresponding figure page. In this manner, both the figure pages and card sheets may be compactly packaged in kit form as a series of figure pages and card sheets having the same surface dimensions. Such expedient further simplifies fabrication of the kit because the same array of figures is printed upon a figure page and corresponding card sheet. Likewise, the identifying indicia appearing on the front face of a figure page is identically reproduced on the rear face of a card sheet.

In a further preferred embodiment, the figures are each comprised of an outer closed line shape which encompasses and inner closed line shape. It is also preferable that, within a given page a given figure is not repeated in identical orientation but is repeated in mirror-image transpositions. It is particularly preferred that the various orientations of any given figure are restricted to positions representing rotation in 86° steps about a center point, thereby providing eight possible orientations per figure. The number of columns on a given page is preferably equal or closely equal to the number of rows on the same page.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figures 1, 2:
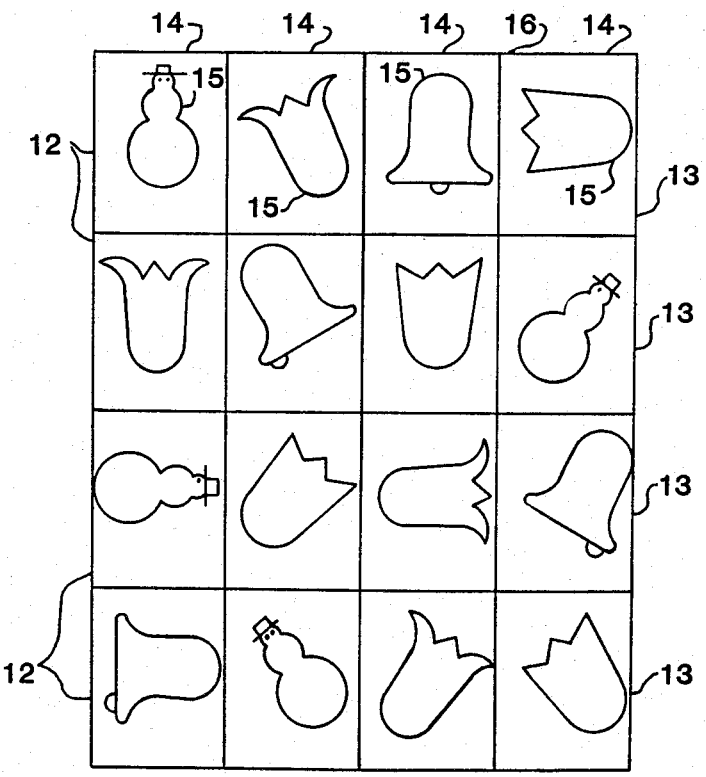
FIG. 1 is an illustration of the front face of an embodiment of a typical card sheet of the kit of the present invention.
FIG. 2 illustrates the rear face of the card sheet of FIG. 1.
Figure 3:
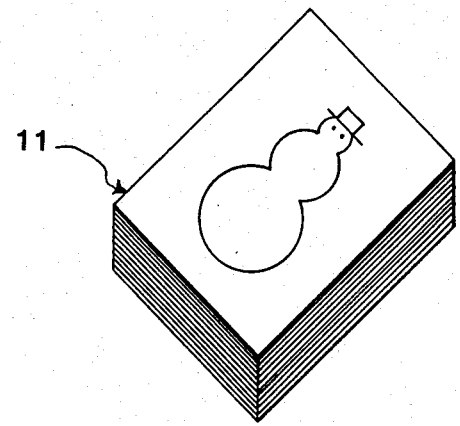
FIG. 3 illustrates a set of cards, derived from the card sheet of FIG. 1, in a stacked mode.
Figure 4:
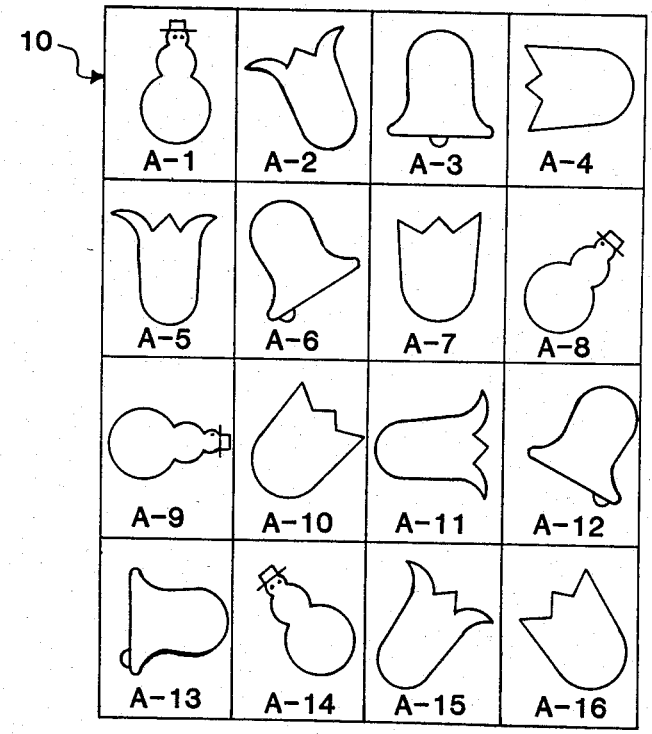
FIG. 4 is an illustration of the front face of a figure page corresponding to the card sheet illustrated in FIG. 1.
Figure 6:
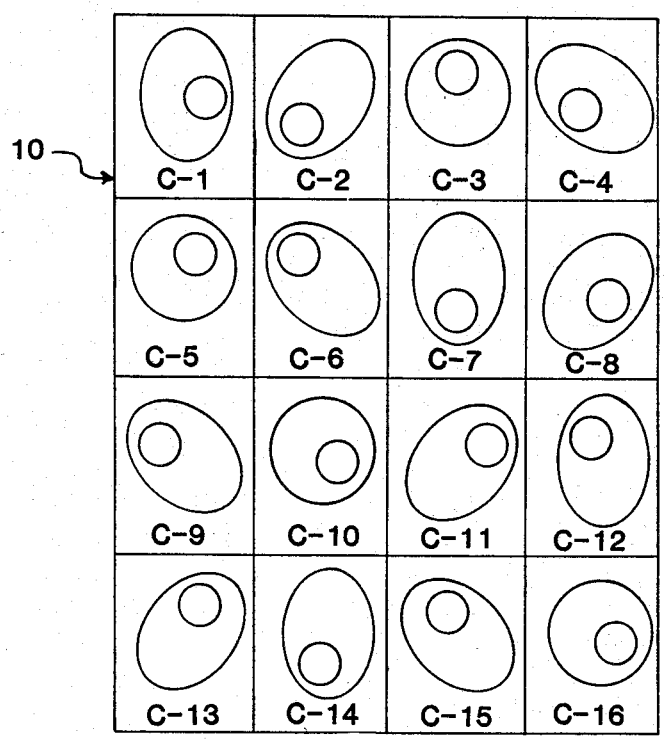
FIGS. 5 and 6 illustrate the front faces of additional typical figure pages suitable for use in the kit of the present invention.
Figure 5:
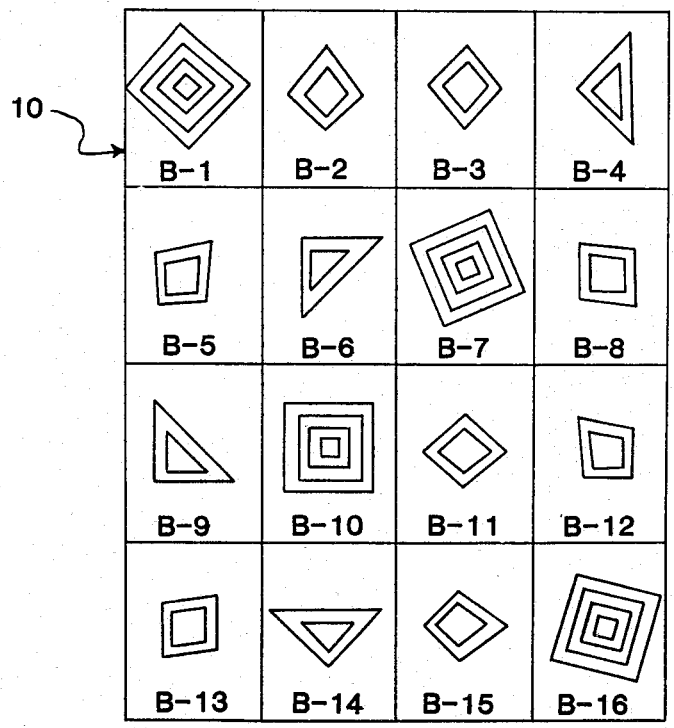

Referring to the drawing, an embodiment of the instructional kit of this invention is shown comprised of figure page 10 shown in FIGS. 4, 5 and 6, and a set of checking cards 11, shown in FIG. 3, and derived from card sheet 16 of FIG. 1. The front face of each figure page and card sheet is divided by ruled straight lines into contiguous rectangular spaces 12 arranged in horizontal rows 13 and vertical columns 14. A closed line diagram or FIG. 15 is contained within each rectangular space. Also appearing in each space of the figure page is a letter-plus-number designation. The letter refers to the particular group of figures of a figure page and accompanying card set. The numbers associated with the letter in the letter-plus-number designation refer to the sequential position of the space, said sequence reading from left to right across a row and returning to the left of the immediately underlying row. Therefore, a figure page of Group A having sixteen spaces will have space designations going from A-1 through A-16. The letter-plus-number designations not only permit matching of the checking cards with the spaces of the figure pages, but constitute means for directing the orientation of the cards. This is achieved by the consistent appearance of the letter-plus-number designations in the same part of the figure-containing space, e.g. top or bottom. The general shape of each figure-containing space and card also facilitates orientation of the checking cards. For example, an elongated rectangular shape disposed with its long axis in a vertical position, such as depicted in the drawing, facilitates rapid orientation in either of two positions. If instead the spaces were square, there would be four possible positions of orientation in the absence of the letter-number orientation-directing means.

Although several identical figures appear in different spaces of the figure page, the figure in each appearance is in a different orientation with respect to rotation about its center. It should be noted that, in the figure page exemplified in FIG. 4, mirror-image transpositional reversals occur with respect to spaces designated A-2 and A-15, A-6 and A-12, and A-10 and A-16.

The front face of card sheet 16 contains the same printed indicia as the front face of matching figure page 10 with the exception that the letter-plus-number designations are omitted. Said letter-plus-number designations appear, however, on the rear face of said card sheet as shown in FIG. 2, and are so arranged that, when individual cards are cut or torn from said card sheet corresponding to each printed space, the rear face of each card will bear the same letter-plus-number designation as the corresponding space on the front face of the figure page. The card sheets are adapted to be converted into a set of checking cards by severance of the card sheet along the lines which define the rectangular spaces.

In one mode of use, the figure pages are given to the student, and the card set is retained by the instructor. The student is then requested to identify mirror-image related figures on a particular page. In some instances, a given time period may be allocated to the request. In other instances, the time required to complete the identification is measured. In an alternative mode of use, the instructor will show the student checking cards, and will ask the student to find matching or mirror-image equivalents on the figure page.

In another mode of use, the student will arrange before him both a figure page and a corresponding set of checking cards. By physically arranging the separate cards, the student can more easily perceive mirror-image relationships than by looking at the figure page. Then, having found matching or mirror-image pairs amongst the cards, he can compare the similarly numbered spaces on the figure page. By repetitious effect in either mode of use, the system causes the student to distinguish differences in the sizes, shapes and spatial relationships of figures. The progress of the student is monitored by periodically ascertaining the time to accomplish the same comparison task and by determining verbal reading ability.

In a still further manner of use, a child student undertakes to arrange a randomized set of checking cards into the same arrangement shown on the corresponding figure sheet, trying to do so in the shortest possible time. The child is thereby challenged by the desire to accomplish the task in shorter time periods. The cards may be arranged on top of the figure sheet or adjacent thereto. Any errors of placement are self-correcting by turning the card over to compare the letter-plus-number designations of the card with those of the figure sheet.

Although the figure pages may be fabricated of ordinary letter-weight paper or of heavier card stock, the checking cards must be on card stock or equivalent stiff material to facilitate their handling and provide durability. The figure pages and checking cards may be white or of other colors, and in fact different colors of paper or printed figures may be coordinated. A number of figure pages of progressively increasing difficulty and an equal number of corresponding card sheets may be packaged along with usage instructions as a kit. Said kit, along with its manner of use, constitute the teaching system of the present invention.

It is to be noted that the teaching system of the present invention is not a game involving the element of chance. Also, the system may be utilized with coordination-handicapped children merely by permitting the handicapped child to verbally direct another person in the placement of the cards. Directions for the use of the teaching system are preferably packaged with the figure pages and card sheets as part of the kit.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An instructional system for training a person to more accurately interpret visually perceived stimuli, said system comprising a kit comprised of:
   (a) figure pages, the front face of each having straight lines dividing the page into an array of rectangular spaces disposed in horizontal rows and vertical columns, said spaces containing randomly distributed closed line figures in at least two groups wherein the figures of a given group are identical but appear in different orientations, and identifying indicia in each rectangular space, and
   (b) a set of checking cards for each figure page, the front faces of the cards of a given set containing figures corresponding to the figures on the front face of a corresponding figure page, and the rear face of each card containing identifying indicia corresponding to the identifying indicia on the front face of said figure page associated with the same figure, the number of cards in each set being equal to or greater than the number of spaces on the front face of the corresponding figure page.

2. The instructional system of claim 1 wherein said set of checking cards is in the form of a card sheet from which individual cards can be derived by severance along said straight lines.

3. The instructional system of claim 1 wherein identifying indicia are letter-plus-number designations.

4. The instructional system of claim 1 wherein said identifying indicia appear in the same position in each space, and thereby constitute means for directing the orientation of the cards.

5. The instructional system of claim 1 wherein the long axis of said rectangular spaces is adapted to be oriented toward said person.

6. The instructional system of claim 2 wherein said card sheet and corresponding figure page are of equal surface dimensions.

7. The instructional system of claim 1. wherein the different orientations of the figures of a given group on a given figure page are orientations with respect to rotation about the center of said figure, and include mirror-image relationships.

8. The instructional system of claim 1 wherein the figure pages are of graduated comprehensional difficulty.

9. The instructional system of claim 1 further including directions for the use of said system.

* * * * *